(12) United States Patent
Ushiyama et al.

(10) Patent No.: US 10,513,421 B2
(45) Date of Patent: Dec. 24, 2019

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Yoshihiko Ushiyama, Aichi-ken (JP); Masaru Ukita, Aichi-ken (JP); Kaoru Yuasa, Aichi-ken (JP); Kosuke Miida, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 276 days.

(21) Appl. No.: 15/663,165

(22) Filed: Jul. 28, 2017

(65) Prior Publication Data

US 2018/0029855 A1 Feb. 1, 2018

(30) Foreign Application Priority Data

Aug. 1, 2016 (JP) ................................. 2016-151380

(51) Int. Cl.
*B60R 22/34* (2006.01)
*B66D 1/50* (2006.01)
*B66D 1/36* (2006.01)
*B66D 1/38* (2006.01)
(Continued)

(52) U.S. Cl.
CPC ............... *B66D 1/50* (2013.01); *B66D 1/365* (2013.01); *B66D 1/38* (2013.01); *B66D 1/7489* (2013.01); *B66D 1/005* (2013.01)

(58) Field of Classification Search
CPC .......... B66D 1/38; B66D 1/50; B60R 22/341; B60R 2022/287; B60R 2022/288
See application file for complete search history.

(56) References Cited

U.S. PATENT DOCUMENTS

2012/0032018 A1* 2/2012 Maekubo ................ B60R 22/36
 242/374
2012/0175451 A1* 7/2012 Yanagawa ........... B60R 22/3413
 242/379.1
(Continued)

FOREIGN PATENT DOCUMENTS

JP 2013-216160 A 10/2013
WO 2012/108475 A1 8/2012

*Primary Examiner* — Sang K Kim
(74) *Attorney, Agent, or Firm* — Roberts Mlotkowski Safran Cole & Calderon P.C.

(57) ABSTRACT

The present disclosure presents a webbing take-up device, which comprises: a spool; a lock section that is restricted from rotating at a time of a vehicle emergency so as to limit rotation of the spool in the pull-out direction; a force limiter mechanism that permits rotation of the spool in the pull-out direction at a force limiter load or greater when rotation of the spool in the pull-out direction with respect to the lock section is being limited; a switching member that switches a load value of the force limiter load by switching between a rotation-restricted state and a rotation-enabled state; and a mounting member that includes a switching member mounting section at which the switching member is disposed, and a restriction section that is engaged with the switching member so as to restrict displacement of the switching member disposed at the switching member mounting section.

5 Claims, 14 Drawing Sheets

(51) Int. Cl.
*B66D 1/74* (2006.01)
*B66D 1/00* (2006.01)

(56) References Cited

U.S. PATENT DOCUMENTS

| | | | | |
|---|---|---|---|---|
| 2012/0318904 | A1* | 12/2012 | Ukita | B60R 22/3413 242/379.1 |
| 2013/0233958 | A1* | 9/2013 | Yanagawa | B60R 22/3413 242/379.1 |
| 2013/0240655 | A1* | 9/2013 | Yanagawa | B60R 22/34 242/407 |
| 2013/0256440 | A1* | 10/2013 | Maekubo | B60R 22/4628 242/374 |
| 2013/0264408 | A1* | 10/2013 | Maekubo | B60R 22/3413 242/379.1 |
| 2014/0239108 | A1* | 8/2014 | Yanagawa | B60R 22/4676 242/379.1 |
| 2016/0046260 | A1* | 2/2016 | Nakamura | B60R 22/3413 242/379.1 |

* cited by examiner

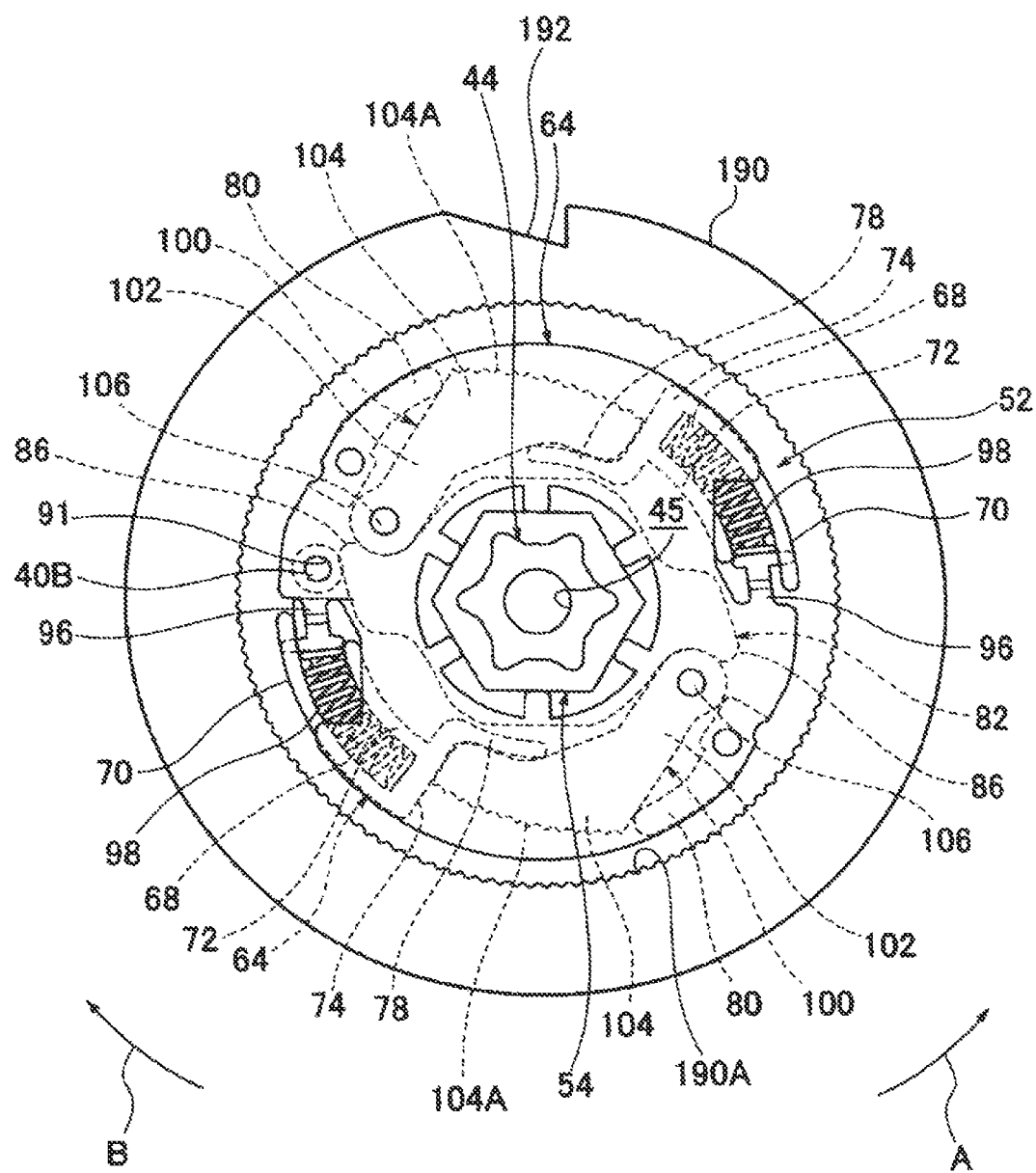

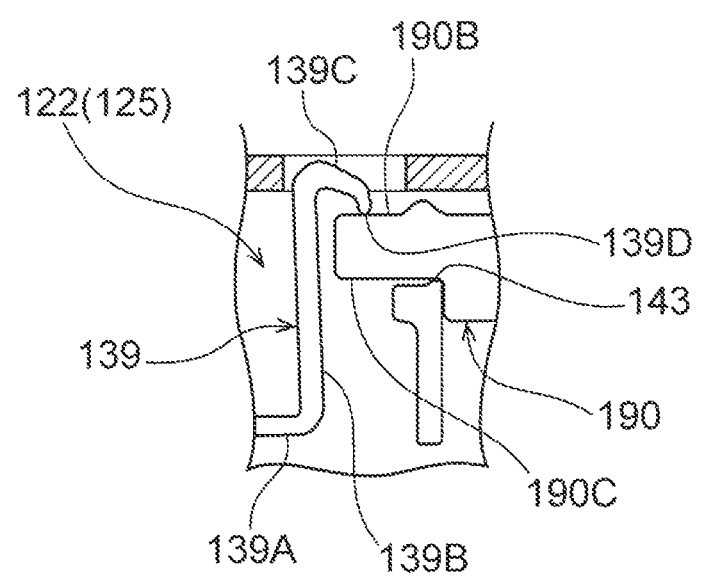

WEBBING TAKE-UP DEVICE

CROSS-REFERENCE TO RELATED APPLICATION

This application is based on and claims priority under 35 USC 119 from Japanese Patent Application No. 2016-151380 filed on Aug. 1, 2016, the disclosure of which is incorporated by reference herein.

BACKGROUND

Technical Field

The present invention relates to a webbing take-up device.

Related Art

Japanese Patent Application Laid-Open (JP-A) No. 2013-216160 describes a webbing take-up device in which a spool is capable of rotating in a pull-out direction at a force limiter load or greater at a time of a vehicle emergency.

In the webbing take-up device described in JP-A No. 2013-216160, the force limiter load is switched by switching between a state in which rotation of a lock ring is restricted and a state in which rotation of the lock ring is permitted.

A reduction in the number of configuration components is desirable in webbing take-up devices capable of switching a force limiter load.

In consideration of the above circumstances, an object of the present invention is to obtain a webbing take-up device capable of reducing the number of configuration components.

A webbing take-up device of a first aspect includes a spool, a lock section, a force limiter mechanism, a switching member, and a mounting member. A webbing worn by an occupant is taken up on the spool, and the spool is rotated in a pull-out direction by the webbing being pulled out. The lock section is restricted from rotating at a time of a vehicle emergency so as to limit rotation of the spool in the pull-out direction. The force limiter mechanism permits rotation of the spool in the pull-out direction at a force limiter load or greater when rotation of the spool in the pull-out direction with respect to the lock section is being limited. A load value of the force limiter load is switched by the switching member by switching between a rotation-restricted state and a rotation-enabled state. The mounting member includes a switching member mounting section at which the switching member is disposed, and a restriction section that is engaged with the switching member so as to restrict displacement of the switching member disposed at the switching member mounting section.

A webbing take-up device of a second aspect is the webbing take-up device of the first aspect, wherein the restriction section applies a bias toward the switching member side using a recovery force arising as a result of elastic deformation in a direction away from the switching member.

A webbing take-up device of a third aspect is the webbing take-up device of either the first aspect or the second aspect, wherein the restriction section is provided with a pressed portion that is pressed by a portion of the switching member when the switching member has rotated such that the restriction section is deformed in a direction away from the switching member.

According to the webbing take-up device of the first aspect, the spool is rotated in the pull-out direction by the webbing being pulled out from the spool. When the lock section is restricted from rotating at a time of a vehicle emergency, rotation of the spool in the pull-out direction is limited, thereby limiting pull-out of the webbing from the spool. Moreover, when a load acting on the force limiter mechanism is the force limiter load or greater, rotation of the spool in the pull-out direction is permitted, thereby permitting the webbing to be pulled out from the spool. Note that in the first aspect of the present invention, the switching member is disposed at the switching member mounting section of the mounting section. Moreover, the load value of the force limiter load can be switched by switching between the rotation-restricted state of the switching member and the rotation-enabled state of the switching member. In the first aspect of the present invention, the mounting member is also provided with the restriction section that engages with the switching member so as to restrict displacement of the switching member that is disposed in the switching member mounting section. Accordingly, in the first aspect of the present invention, there is no need to provide a member to restrict displacement of the switching member separately to the mounting member, thereby enabling a reduction in the number of components configuring the webbing take-up device.

According to the webbing take-up device of the second aspect, the restriction section is capable of applying a bias toward the switching member side using a recovery force acting in the restriction section when elastically deformed. This thereby enables the occurrence of noise resulting from displacement of the switching member inside the switching member mounting section to be suppressed.

According to the webbing take-up device of the third aspect, the restriction section is deformed in a direction away from the switching member when the pressed portion of the restriction section is pressed by a portion of the switching member that has rotated. This thereby enables the restriction section to be suppressed from obstructing rotation of the switching member.

BRIEF DESCRIPTION OF THE DRAWINGS

Exemplary embodiments of the present invention will be described in detail based on the following figures, wherein:

FIG. 4 is a front view of the clutch mechanism of the webbing take-up device illustrated in FIG. 2 and FIG. 3, as viewed from the opposite side to the spool;

FIG. 9C is an enlarged view illustrating the lock ring engagement claw and the like as viewed along the direction indicated by arrow 9C in FIG. 9A;

DETAILED DESCRIPTION

Explanation follows regarding a webbing take-up device according to an exemplary embodiment of the present invention, with reference to FIG. 1 to FIG. 9C.

Figure 1:
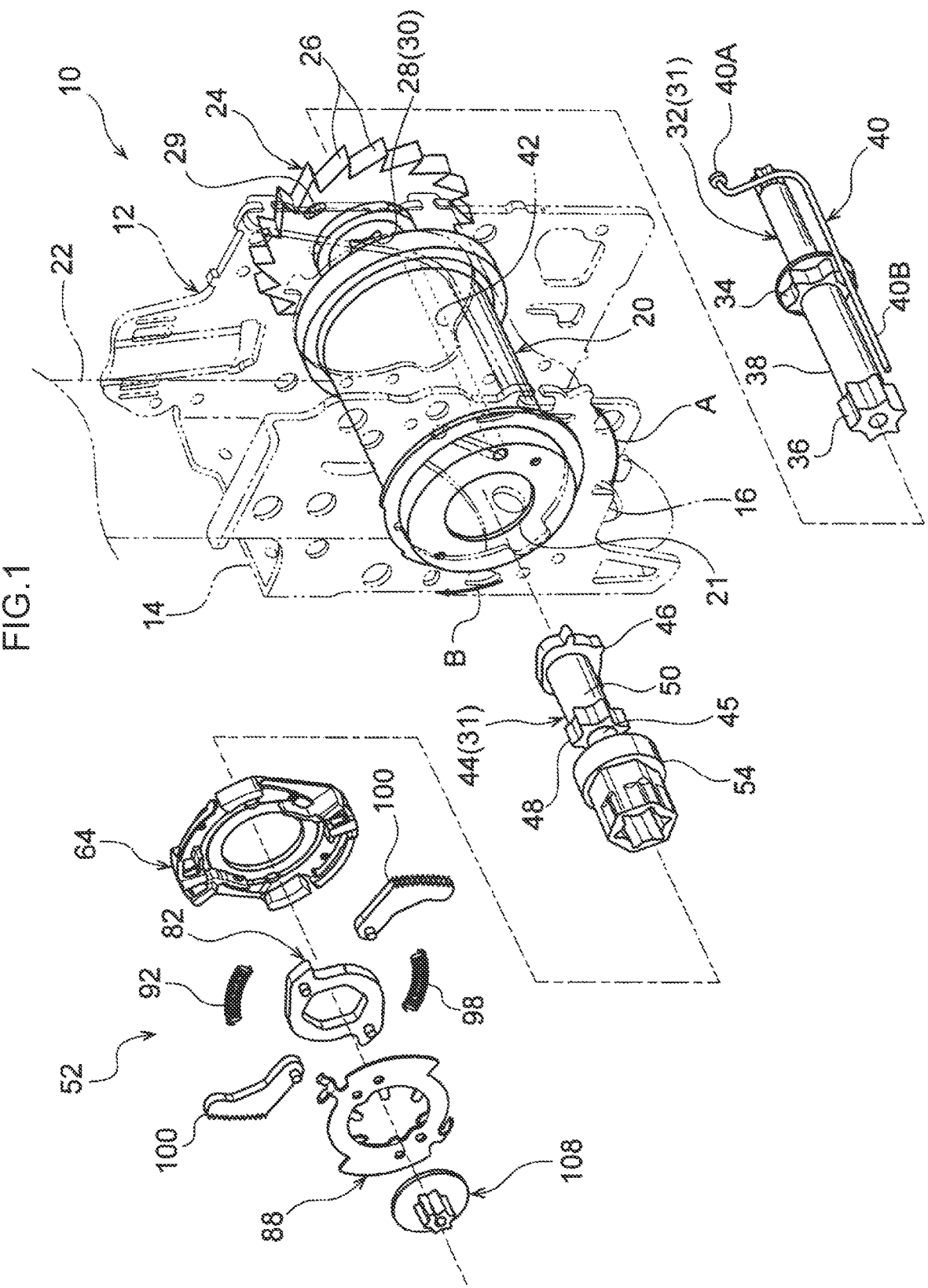
FIG. 1 is an exploded perspective view illustrating configuration of relevant portions of a webbing take-up device according to an exemplary embodiment.
Figure 6:
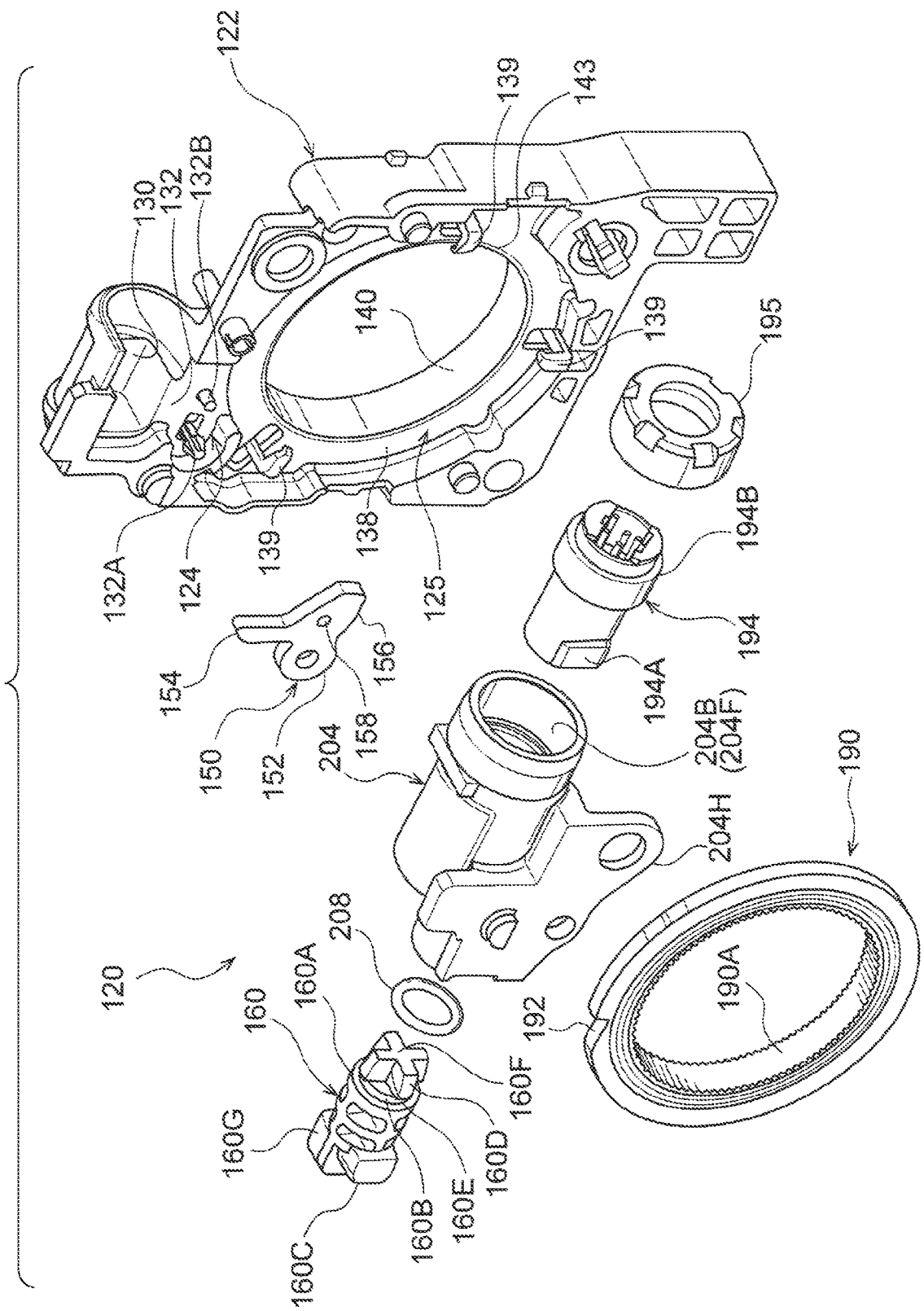
FIG. 6 is an exploded perspective view illustrating a force limiter load switching mechanism of the webbing take-up device illustrated in FIG. 1.

As illustrated in FIG. 1, a webbing take-up device 10 according to an exemplary embodiment of the present invention includes a frame 12, a spool 20, a webbing 22, a lock gear 24 serving as a lock section, a main torsion shaft 32 configuring a force limiter mechanism 31, a trigger wire 40, a sub torsion shaft 44, and a clutch mechanism 52. Moreover, as illustrated in FIG. 6, the webbing take-up device 10 further includes a force limiter load switching mechanism 120. First, explanation follows regarding the frame 12, followed by explanation regarding the spool 20, the webbing 22, the lock gear 24, the main torsion shaft 32, the trigger wire 40, the sub torsion shaft 44, the clutch mechanism 52, and the force limiter load switching mechanism 120 in turn.

As illustrated in FIG. 1, the frame 12 includes a plate shaped back plate 14 that is formed with a substantially concave shape in plan view and that is fixed to a vehicle body. Leg plates 16, 18 extend out perpendicularly from both width direction end portions of the back plate 14. A known lock mechanism (not illustrated in the drawings) is attached to the outside of the leg plate 18.

The spool 20 is formed in a circular cylinder shape formed with a through hole 21 penetrating along the axial direction, and the spool 20 is disposed between the leg plate 16 and the leg plate 18 of the frame 12. The spool 20 is disposed in a state in which the axial direction of the spool 20 runs in the direction in which the leg plate 16 and the leg plate 18 face each other, and the spool 20 is supported so as to be rotatable by the frame 12 through the main torsion shaft 32, the sub torsion shaft 44, and the like, described later.

The webbing 22 is worn over the body of an occupant. A base end portion of the webbing 22, this being one length direction end portion of the webbing 22, is anchored to the spool 20. The spool 20 is configured to take up and store the webbing 22 from the base end side when the spool 20 rotates in a take-up direction (the arrow A direction in FIG. 1, etc.), this being one rotation direction.

The lock gear 24 is disposed on one axial direction side of the spool 20 so as to be coaxial to the spool 20. An outer peripheral portion of the lock gear 24 is formed with gear portions 26. An axial center portion of the lock gear 24 is formed with a through hole 28 penetrating the lock gear 24 in the axial direction, and an inner peripheral portion of the through hole 28 is formed with a spline shaped engaged portion 30.

The lock gear 24 engages with a locking member (not illustrated in the drawings) when the vehicle decelerates sharply, or when the spool 20 rotates sharply in a pull-out direction. As a result, rotation of the lock gear 24 in the pull-out direction (arrow B direction in FIG. 1 etc.) is restricted (locked), thereby restricting rotation of the spool 20 in the pull-out direction.

The main torsion shaft 32 is disposed coaxially to the spool 20 and the lock gear 24, and is inserted through each of the through hole 21 of the spool 20 and the through hole 28 of the lock gear 24. The main torsion shaft 32 is formed with a spline shaped first engaging portion 34 at a length direction central portion, and is similarly formed with a spline shaped second engaging portion 36 at a leading end portion. The first engaging portion 34 engages with the engaged portion 30 of the lock gear 24, thus fixing the main torsion shaft 32 to the lock gear 24 so as to be capable of rotating as a unit together with the lock gear 24. The second engaging portion 36 engages with an engaged portion, not illustrated in the drawings, formed at an axial direction intermediate portion of an inner peripheral portion of the spool 20, thus fixing the main torsion shaft 32 so as to be capable of rotating as a unit together with the spool 20. A portion of the main torsion shaft 32 between the first engaging portion 34 and the second engaging portion 36 configures a first energy absorption section 38 that absorbs kinetic energy of the occupant pulling on the webbing 22, as described later.

A base end portion 40A of the trigger wire 40 is inserted into a hole 29 formed in the lock gear 24 at a position further to a radial direction outside than the through hole 28, thereby anchoring the trigger wire 40 to the lock gear 24. Further to a leading end side of the trigger wire 40 than the base end portion 40A, the trigger wire 40 is inserted into a hole 42 formed alongside the through hole 21 in the spool 20. A leading end portion 40B of the trigger wire 40 projects out from the spool 20 toward another axial direction side.

The sub torsion shaft 44 is disposed coaxially to the main torsion shaft 32, and the sub torsion shaft 44 is inserted into the through hole 21 in the spool 20 at a base end side of a length direction central portion of the sub torsion shaft 44. The sub torsion shaft 44 projects out from the spool 20 toward the other axial direction side at a leading end side of the length direction central portion of the sub torsion shaft 44. A spline shaped first engaging portion 46 is formed to at least a portion of a base end portion of the sub torsion shaft 44, and a spline shaped second engaging portion 48 is similarly formed to a leading end portion of the sub torsion shaft 44. The first engaging portion 46 engages with an engaged portion, not illustrated in the drawings, formed at the axial direction intermediate portion of the inner peripheral portion of the spool 20, thereby fixing the sub torsion shaft 44 so as to be capable of rotating as a unit together with the spool 20. A portion of the sub torsion shaft 44 between the first engaging portion 46 and the second engaging portion 48 configures a second energy absorption section 50 that absorbs kinetic energy of the occupant pulling on the webbing 22, as described later.

Figure 2:
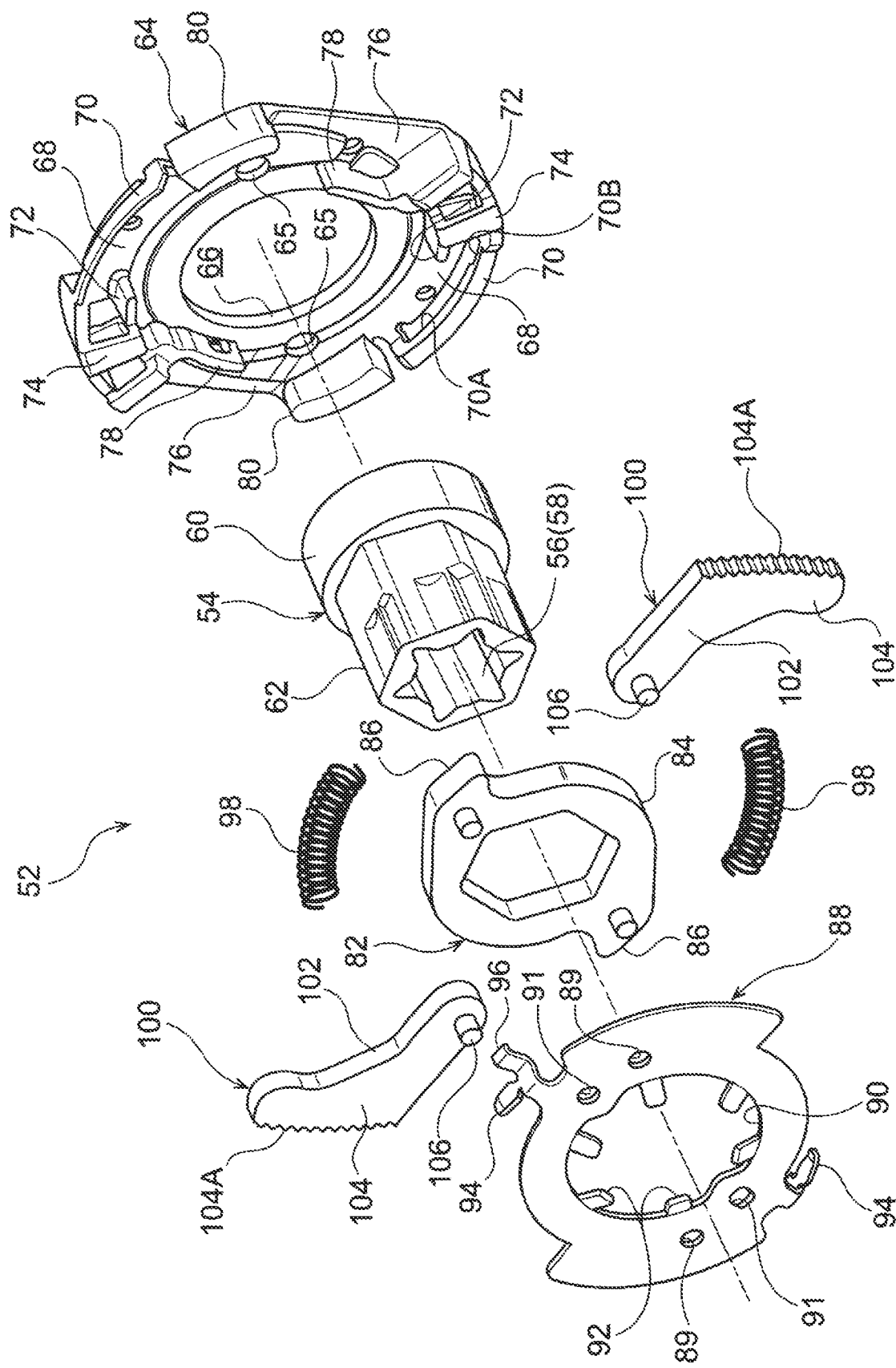
FIG. 2 is an exploded perspective view illustrating configuration of a clutch mechanism of the webbing take-up device illustrated in FIG. 1.
Figure 3:
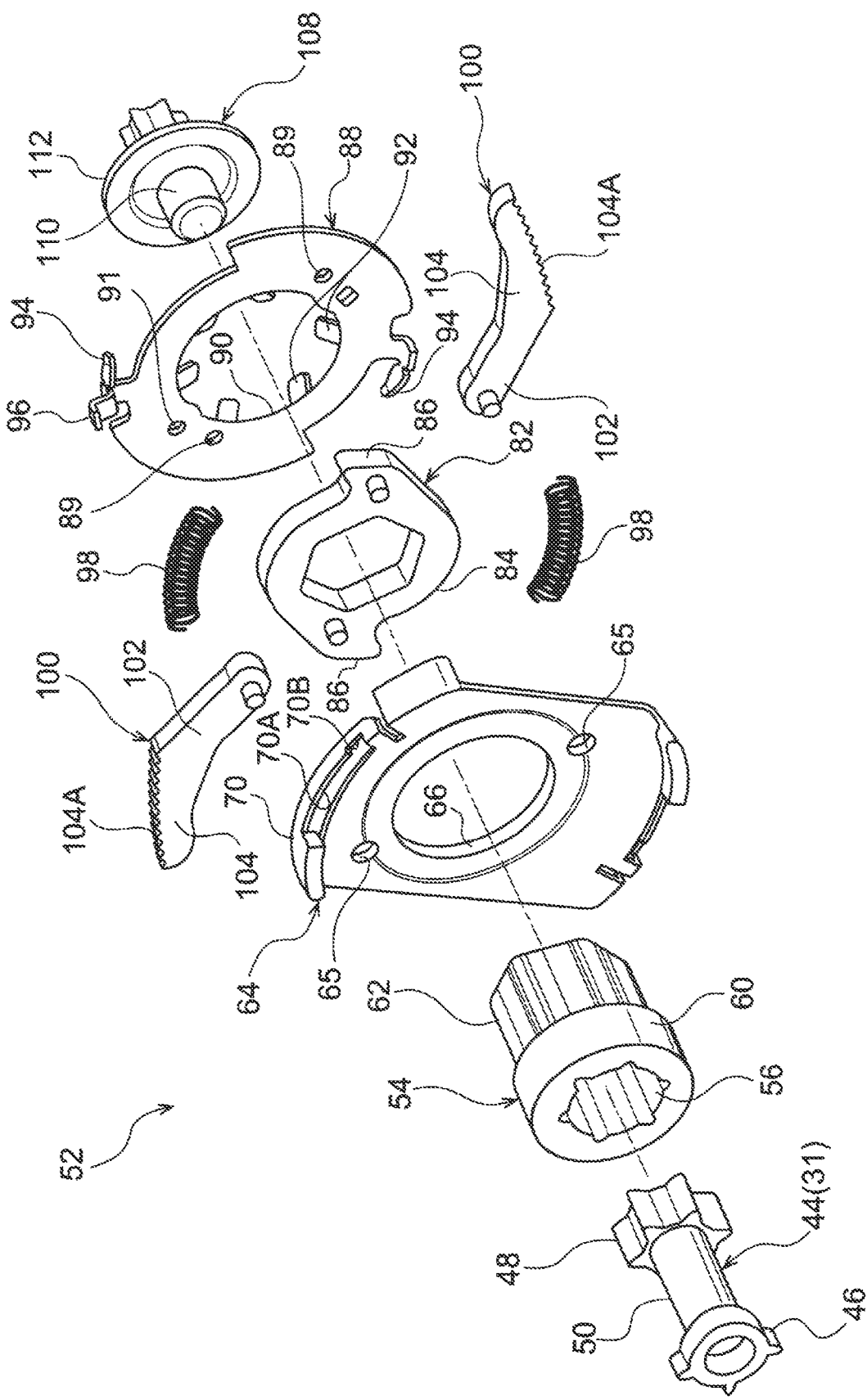
FIG. 3 is an exploded perspective view of a clutch mechanism of the webbing take-up device illustrated in FIG. 1, as viewed from the opposite side to a spool.
Figure 5A:
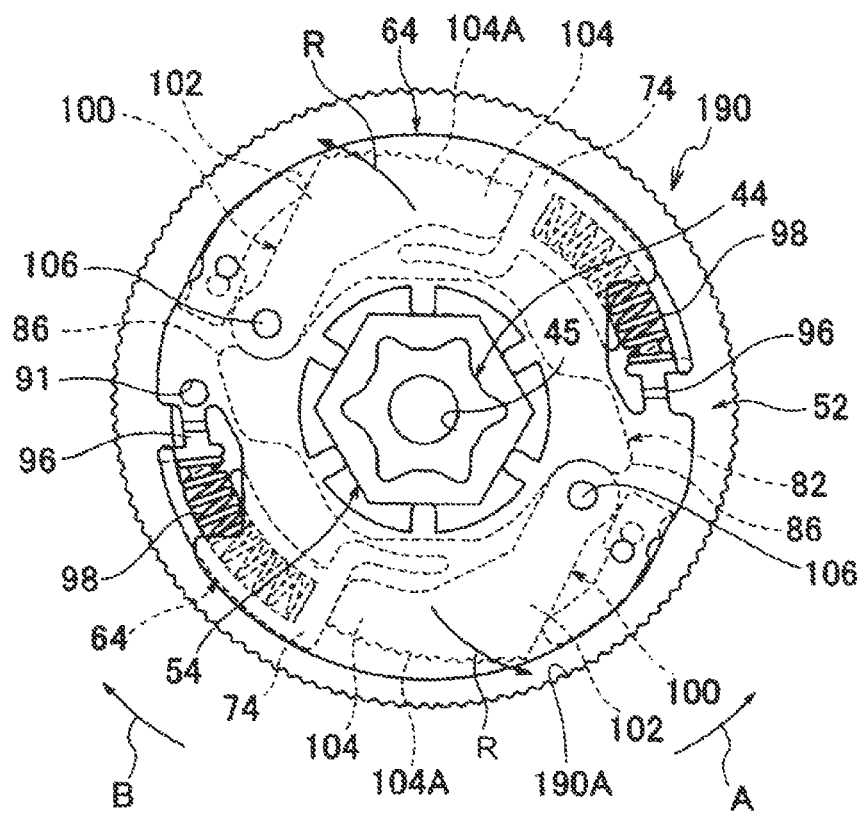
FIG. 5A is a diagram illustrating a state in which clutch plates of the clutch mechanism illustrated in FIG. 4 have started to swing toward the side of a lock ring.
Figure 5B:
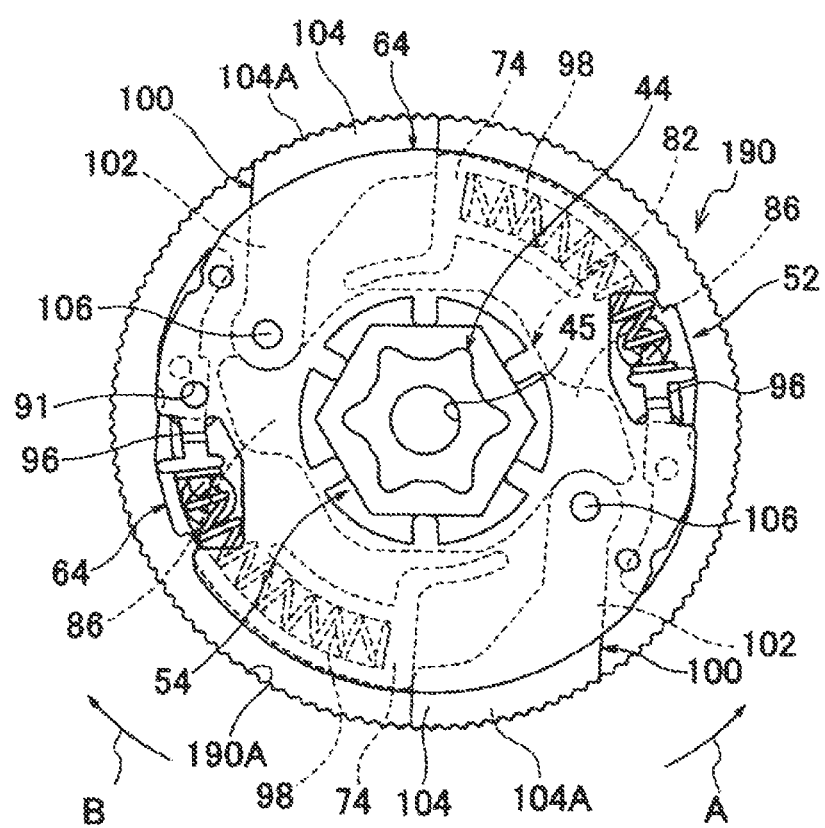
FIG. 5B is a diagram illustrating a state in which the clutch plates of the clutch mechanism illustrated in FIG. 4 have meshed together with a lock ring.

As illustrated in FIG. 2 and FIG. 3, the clutch mechanism 52 includes a sleeve 54, a clutch guide 64, a clutch base 82, a clutch cover 88, a pair of clutch plates 100, a screw 108, and a pair of coil springs 98. Note that FIG. 5A illustrates a mid-actuation state of the clutch mechanism 52, and FIG. 5B illustrates a state in which actuation of the clutch mechanism 52 has completed.

As illustrated in FIG. 3, the sleeve 54 is disposed coaxially to the sub torsion shaft 44. An axial center portion of the sleeve 54 is formed with a through hole 56 penetrating the sleeve 54 in an axial direction. The sub torsion shaft 44 described above is inserted into the through hole 56 with play between the sub torsion shaft 44 and the through hole 56. Moreover, as illustrated in FIG. 2, a spline shaped engaged portion 58 is formed in a leading end side of an inner peripheral portion of the sleeve 54. The second engaging portion 48 (see FIG. 3) of the sub torsion shaft 44 engages with the engaged portion 58, thereby fixing the sleeve 54 so as to be capable of rotating as a unit together with the sub torsion shaft 44. A base end side of the sleeve 54 configures a support portion 60 with a circular outer profile, and to a leading end side of the support portion 60, the sleeve 54 configures a fitting portion 62 with a hexagonal outer profile.

The clutch guide 64 is made of a resin, and is formed in a ring shape with a through hole 66 penetrating in an axial direction. The support portion 60 mentioned above is inserted into the through hole 66, thereby supporting the clutch guide 64 so as to be capable of rotating relative to the sleeve 54. A pair of coil spring housing portions 68 that house the coil springs 98 are formed at two positions in a circumferential direction of the clutch guide 64. The coil spring housing portions 68 are disposed with point symmetry to one another about the center of the clutch guide 64, and are each formed in a substantially J-shape and include an outside wall 70 and an inside wall 72 respectively extending along the circumferential direction of the clutch guide 64, and a coupling wall 74 extending in a radial direction of the clutch guide 64 and coupling together respective end portions of the outside wall 70 and the inside wall 72. The outside wall 70 is formed with an elongated guide hole 70A with its length direction running along the circumferential direction.

The clutch guide 64 is further formed with a pair of clutch plate housing portions 76 that house the clutch plates 100. The clutch plate housing portions 76 are formed so as to be adjacent to the respective coil spring housing portions 68. Each clutch plate housing portion 76 includes a first support wall 78 extending from the coupling wall 74 toward the opposite side to the inside wall 72, and a second support wall 80 spaced away from the coupling wall 74 on the opposite side of the coupling wall 74 to the outside wall 70. The first support wall 78 and the second support wall 80 are provided standing out from the clutch plate housing portions 76.

The clutch base 82 is configured including a ring shaped fitted portion 84. The fitting portion 62 of the sleeve 54 is fitted (press-fitted) inside the fitted portion 84, thereby fixing the clutch base 82 so as to be capable of rotating as a unit together with the sleeve 54. Note that in an alternative embodiment, the sleeve 54 and the clutch base 82 may be formed integrally to each other. The clutch base 82 is further formed with a pair of anchor portions 86 projecting out from the fitted portion 84 toward the outside. The anchor portions 86 are respectively anchored to base end portions of arms 102 formed to the clutch plates 100, described later.

The clutch cover 88 is disposed coaxially to the sleeve 54, and is disposed on the opposite side of the clutch guide 64 to the spool 20, so as to oppose the clutch guide 64. The clutch cover 88 is formed in a ring shape with a through hole 90 penetrating in an axial direction, and plural fitting claws 92 are formed projecting out toward a radial direction inside at an inner peripheral portion of the clutch cover 88. The fitting portion 62 of the sleeve 54 is inserted into the through hole 90, and the plural fitting claws 92 engage with the fitting portion 62, thereby fixing the clutch cover 88 so as to be capable of rotating as a unit together with the sleeve 54, and thus with the sub torsion shaft 44.

Moreover, a pair of spring anchor claws 94 are provided to the clutch cover 88 at two positions in the circumferential direction of the clutch cover 88. The pair of spring anchor claws 94 are disposed with point symmetry about the center of the clutch cover 88. The pair of spring anchor claws 94 respectively anchor one end portion of each of the coil springs 98 disposed in the coil spring housing portions 68 of the clutch guide 64. A guide claw 96 is provided at an outer peripheral portion of one of the spring anchor claws 94. The guide claw 96 is disposed inside the guide holes 70A provided to the clutch guide 64, and moves along the guide hole 70A such that the clutch guide 64 is capable of rotating relative to the clutch cover 88 between an actuated position illustrated in FIG. 5B and a non-actuated position illustrated in FIG. 4.

As illustrated in FIG. 2, the clutch plates 100 are disposed between the clutch cover 88 and the clutch guide 64. Each of the clutch plates 100 includes the arm 102, and a circular arc portion 104 formed at a leading end portion of the arm 102. A base end portion of the arm 102 is formed with a swing shaft 106 that projects out toward the clutch cover 88 side and extends along the axial direction of the sub torsion shaft 44. The swing shaft 106 is inserted into a hole 89 formed in the clutch cover 88 such that the respective clutch plate 100 is supported by the clutch cover 88 so as to be capable of swinging. Moreover, an outer peripheral portion of the circular arc portion 104 (leading end portion of the clutch plate 100) is formed with knurled teeth 104A with a spur teeth profile.

As illustrated in FIG. 3, the screw 108 is configured including a threaded portion 110, and a retaining portion 112 that has a larger diameter than the threaded portion 110. The threaded portion 110 is screwed into a threaded hole 45 (see FIG. 1) formed in a leading end portion of the sub torsion shaft 44, thereby fixing the screw 108 to the leading end portion of the sub torsion shaft 44. In this manner, the retaining portion 112 is abutted against a leading end portion of the sleeve 54 in a state in which the screw 108 is fixed to the leading end portion of the sub torsion shaft 44. This thereby limits movement of the sleeve 54 in a direction that would cause the sleeve 54 to come out from the sub torsion shaft 44. Note that in this state, the clutch cover 88 and the spool 20 limit axial direction movement of the clutch guide 64.

As illustrated in FIG. 2 and FIG. 3, the clutch guide 64 and the clutch cover 88 described above are respectively formed with holes 65, 91. The holes 65, 91 are formed so as to oppose each other in a state in which the clutch guide 64 is disposed at the non-actuated position with respect to the clutch cover 88. The leading end portion 40B of the trigger wire 40 (see FIG. 1) is inserted through the respective holes 65, 91. This thereby limits rotation of the clutch guide 64 relative to the spool 20 and the clutch cover 88 in a state in which the clutch guide 64 is disposed at the non-actuated position (the clutch guide 64 is restrained at the non-actuated position).

Moreover, in a state in which the clutch guide 64 is restrained at the non-actuated position as described above, the coil springs 98 are compressed between the coil spring housing portions 68 (coupling walls 74) of the clutch guide 64 and the spring anchor claws 94 of the clutch cover 88.

This state is a state in which a sufficient spacing is secured between the holes 89 in the clutch cover 88 (swing shafts 106 of the clutch plates 100) and the coupling walls 74 for the clutch plates 100 to be housed in the clutch plate housing portions 76, such that the knurled teeth 104A are stowed at the inside of an outer peripheral portion of the clutch guide 64. In this state, the coupling walls 74 abut leading ends of the circular arc portions 104.

Figure 7:
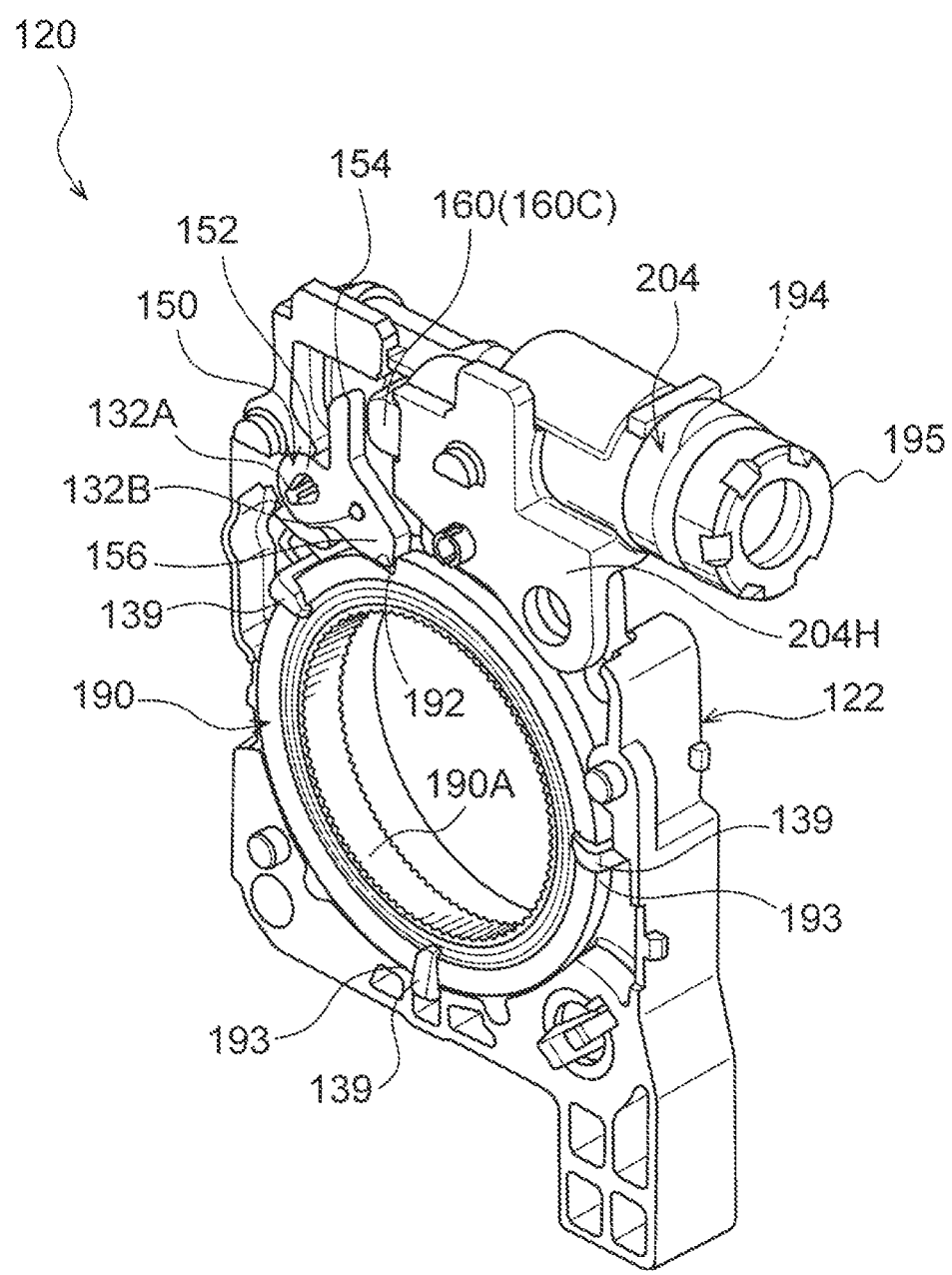
FIG. 7 is a perspective view illustrating a state on completion of assembly of the force limiter load switching mechanism illustrated in FIG. 6.
Figure 8A:
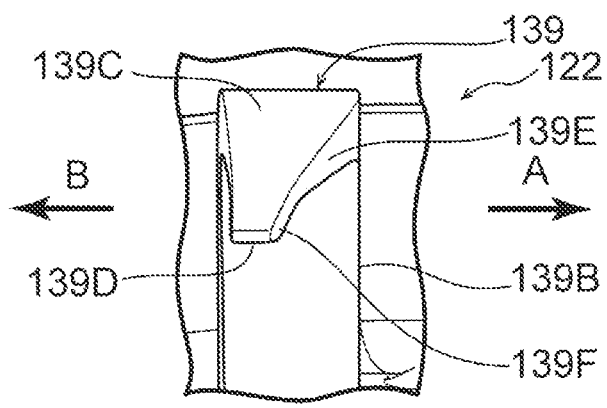
FIG. 8A is an enlarged view of a lock ring engagement claw provided to a body as viewed from one direction.
Figure 8B:
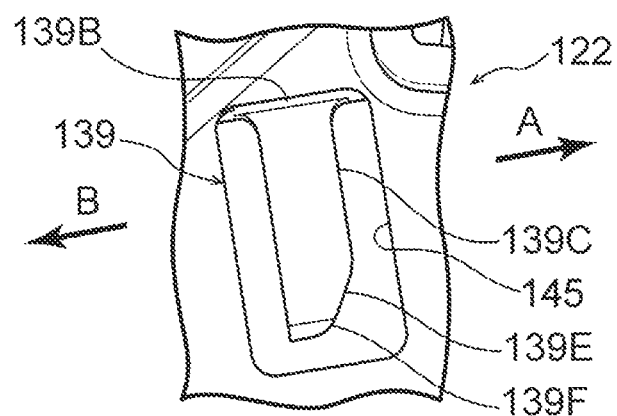
FIG. 8B is an enlarged view of a lock ring engagement claw provided to a body as viewed from another direction.
Figure 8C:
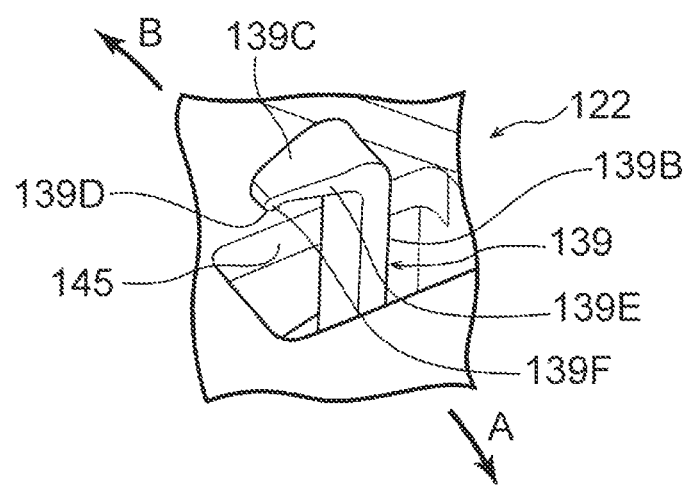
FIG. 8C is an enlarged view of a lock ring engagement claw provided to a body as viewed from yet another direction.
Figure 8D:
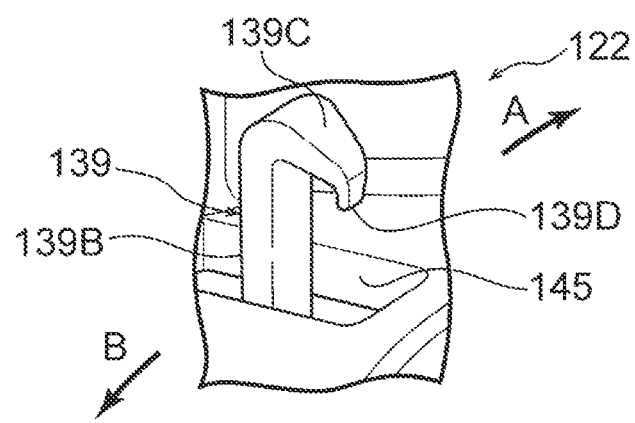
FIG. 8D is an enlarged view of a lock ring engagement claw provided to a body as viewed from yet another direction.

As illustrated in FIG. 6 and FIG. 7, the force limiter load switching mechanism 120 includes a body 122 serving as a mounting member formed in a box shape, a gas generator 194 serving as a gas generation device, a piston section 160 that actuates when subjected to pressure from gas generated by the gas generator 194, and a cylinder 204 that internally houses part of the piston section 160. The force limiter load switching mechanism 120 further includes a pawl 150, serving as a switching member, that is displaced by being pressed by the piston section 160, and a lock ring 190, serving as a switching member, that is restricted from rotating by the pawl 150 or has this rotation restriction released by the pawl 150.

The body 122 is formed using a resin material, and is formed so as to be open toward the side of the leg plate 16 of the frame 12 (see FIG. 1). Specifically, the body 122 includes the pawl 150, described later, a first housing portion 124 in which part of the piston section 160 is housed, and a second housing portion 125, serving as a switching member mounting section in which the lock ring 190 is rotatably housed.

The first housing portion 124 is formed with a housing groove 130 that houses the piston section 160 such that the piston section 160 is capable of moving. The housing groove 130 is formed so as to be open toward the side of the leg plate 16 of the frame 12 (see FIG. 1). The first housing portion 124 is further formed with a recess 132 that houses the pawl 150 and that is connected to the housing groove 130 described above. The recess 132 is formed so as to be open toward the side of the leg plate 16 of the frame 12 (see FIG. 1). Moreover, the recess 132 is provided with a shaft support portion 132A that rotatably supports a shaft portion 152 of the pawl 150 and stands out in the recess 132, and a shear pin 132B that stands out from the recess 132 and restricts rotation of the pawl 150 about the shaft support portion 132A.

The second housing portion 125 is formed with a recess 138 that houses the lock ring 190. The recess 138 is formed so as to be open toward the side of the leg plate 16 of the frame 12 (see FIG. 1). A circular opening 140 that is concentric to the axial center of the spool 20 (see FIG. 1) is formed through the recess 138. An edge of the circular opening 140 is formed with a projection 143 (see FIG. 9C) that projects out toward the side of the lock ring 190 and abuts a face 190C on another rotation axial direction side of the lock ring 190 (the opposite side to the leg plate 16 side (see FIG. 1)). Moreover, the second housing portion 125 is provided with three lock ring engagement claws 139, serving as restriction sections that engage with the lock ring 190 disposed inside the recess 138 so as to restrict movement of the lock ring 190 toward the leg plate 16 side.

The body 122 described above is fixed to the outside of the leg plate 16 (see FIG. 1).

The gas generator 194 is formed in a substantially circular cylinder shape, and one end portion of the gas generator 194 is configured by a gas ejection section 194A that ejects gas, and another end portion of the gas generator 194 is configured by a wiring connection section 194B that is connected to wiring. The gas generator 194 is inserted into a second cylindrical portion 204B of the cylinder 204, described later, from the gas ejection section 194A side, and the gas generator 194 is fixed to the cylinder 204 using a fixing member 195.

The pawl 150 is formed in a block shape using a metal material, and includes a shaft portion 152 with a substantially circular cross-section profile, and an arm 154 and an engaging portion 156 respectively formed so as to extend out toward a radial direction outside of the shaft portion 152. The shaft portion 152 is supported so as to be rotatable by the shaft support portion 132A provided to the first housing portion 124 of the body 122. Moreover, the pawl 150 is formed with an anchor hole 158 with a circular cross-section profile. The shear pin 132B provided to the first housing portion 124 of the body 122 is inserted into the anchor hole 158, thereby restricting rotation of the pawl 150 about the shaft support portion 132A. In an inserted state of the shear pin 132B into the anchor hole 158, the engaging portion 156 engages with a notch 192 in the lock ring 190, described later. Note that the position of the pawl 150 when in this state is referred to as the "locked position". Moreover, in a state in which the pawl 150 is positioned at the locked position, the arm 154 is disposed in close proximity to a press portion 160C of the piston section 160, described later.

As illustrated in FIG. 4, the lock ring 190 is formed substantially in a ring shape using a metal material. The lock ring 190 is disposed at the peripheral outside of the clutch mechanism 52 and is coaxial to the clutch mechanism 52. Moreover, as illustrated in FIG. 6, an inner peripheral portion of the lock ring 190 is formed with knurled teeth 190A with a spur teeth profile. An outer peripheral portion of the lock ring 190 is formed with the notch 192 that has a substantially triangular cross-section profile, and the notch 192 is open toward a radial direction outside of the lock ring 190. The lock ring 190 described above is supported so as to be rotatable with respect to the body 122 in a state in which the lock ring 190 is housed in the recess 138 formed in the second housing portion 125 of the body 122.

As illustrated in FIG. 6, the piston section 160 is formed using a resin material. A base end side of the piston section 160 is configured by an insertion portion 160A that is formed with a substantially circular column shape and that is inserted into a first cylindrical portion 204A of the cylinder 204, described later. An outer peripheral portion of an axial direction intermediate portion of the insertion portion 160A is formed with an O-ring attachment groove 160B, serving as a recessed groove running in the circumferential direction of the insertion portion 160A. An O-ring 208 formed using a viscoelastic material such as rubber engages with the O-ring attachment groove 160B so as to attach the O-ring 208 to the piston section 160.

An end portion of the insertion portion 160A on the opposite side to the side provided with the press portion 160C, described later, namely a location further to the base end side of the insertion portion 160A than the location formed with the O-ring attachment groove 160B, is configured by a tapered section 160D formed so as to gradually taper on progression toward the opposite side to the press portion 160C. The tapered section 160D is formed with four V-shaped grooves 160E having substantially V-shaped edges. One end portion of each V-shaped groove 160E is connected to the O-ring attachment groove 160B.

The press portion 160C that presses the arm 154 of the pawl 150 (see FIG. 6) is provided on a leading end side of the piston section 160. The leading end side of the piston section 160 is also provided with a guide block 160G that is disposed inside the housing groove 130 (see FIG. 6) provided to the first housing portion 124 of the body 122, and that moves along the housing groove 130. The guide block 160G is adjacent to the press portion 160C.

The cylinder 204 is formed using a metal material. Specifically, the cylinder 204 includes the first cylindrical portion 204A that is formed in a tube shape and into which the insertion portion 160A of the piston section 160 described above is inserted, and the second cylindrical portion 204B that is in communication with the first cylindrical portion 204A and that is internally supplied with gas from the gas generator 194. An inner peripheral face of the first cylindrical portion 204A is formed with a circular cylinder shaped face profile corresponding to the external profile of the O-ring 208 described above. An end portion of the second cylindrical portion 204B on the opposite side to the first cylindrical portion 204A is configured by an engaged portion 204F with which the gas generator 194 engages.

The cylinder 204 further includes a fixing flange 204H formed in the shape of a tongue plate. The fixing flange 204H is fixed to the body 122, thereby attaching the cylinder 204 to the body 122.

Next, explanation follows regarding detailed configuration of the lock ring engagement claws 139 provided to the body 122, these being a relevant portion of the present exemplary embodiment. Note that in the following explanation, reference to the axial direction, circumferential direction, and radial direction refers to the direction of the rotation axis, a rotation circumferential direction, and a rotation radial direction in relation to the lock ring 190. Note that the direction of the rotation axis, rotation circumferential direction, and rotation radial direction in relation to the lock ring 190 correspond to the direction of the rotation axis, a rotation circumferential direction, and a rotation radial direction in relation to the spool 20.

As illustrated in FIG. 6 and FIG. 8A to FIG. 8D, the lock ring engagement claws 139 are integrally formed to the body 122. As illustrated in FIG. 9C, each lock ring engagement claw 139 includes a first extension portion 139A extending toward the radial direction inside from a lock ring engagement tooth support portion, not illustrated in the drawings, provided to the body 122, and a second extension portion 139B extending from a radial direction inside end portion of the first extension portion 139A toward one axial direction side (the leg plate 16 side (see FIG. 1)). The second extension portion 139B is inserted through an opening 145 formed in the body 122, such that a portion of the second extension portion 139B on the opposite side to the first extension portion 139A projects out toward the side where the lock ring 190 is disposed in the body 122 (the second housing portion 125 side).

Each lock ring engagement claw 139 further includes a third extension portion 139C extending obliquely from one axial direction side end portion of the second extension portion 139B toward the another axial direction side on progression toward the radial direction inside, and a leading end portion 139D projecting out from a radial direction inside end portion of the third extension portion 139C toward the another axial direction side. The leading end portion 139D abuts a face 190B on the one axial direction side of the lock ring 190, and the lock ring 190 is interposed between the leading end portion 139D and the projection 143, thereby restricting axial direction movement of the lock ring 190. Note that in the present exemplary embodiment, the first extension portion 139A, the second extension portion 139B, and the third extension portion 139C of the lock ring engagement claw 139 are capable of flexural deformation (elastic deformation). This thereby enables the leading end portion 139D of the lock ring engagement claw 139 to be displaced in a direction away from the lock ring 190. Moreover, using a recovery force that arises due to the flexural deformation of the first extension portion 139A, the second extension portion 139B, and the third extension portion 139C of the lock ring engagement claw 139, the leading end portion 139D of the lock ring engagement claw 139 applies a bias to the face 190B on the one axial direction side of the lock ring 190.

As illustrated in FIG. 8A to FIG. 8D, an end face on another circumferential direction side (arrow A direction side) of the third extension portion 139C is configured by a first pressed face 139E, serving as a pressed portion, inclined toward one circumferential direction side (arrow B direction side) on progression toward the radial direction inside as viewed from the one axial direction side. An end face on the another circumferential direction side of the leading end portion 139D (arrow A direction side) is configured by a second pressed face 139F, serving as a pressed portion, inclined toward the one circumferential direction side (arrow B direction side) on progression toward the another axial direction side as viewed from the radial direction inside.

Operation and Advantageous Effects of the Present Exemplary Embodiment

Next, explanation follows regarding operation and advantageous effects of the present exemplary embodiment.

As illustrated in FIG. 1, in the webbing take-up device 10 according to the present exemplary embodiment, the spool 20, the lock gear 24, the main torsion shaft 32, the sub torsion shaft 44, and the clutch mechanism 52 (including the sleeve 54, the clutch base 82, the clutch plates 100, and the screw 108) are configured capable of rotating together as a unit in the take-up direction and the pull-out direction. Accordingly, configuration is such that the webbing 22 is worn over the body of the occupant of the vehicle by pulling the webbing 22 out from the spool 20. Moreover, in a state in which the webbing 22 is being worn over the body of the occupant of the vehicle, for example in a state of sudden deceleration of the vehicle, the lock mechanism actuates so as to prevent rotation of the lock gear 24 in the pull-out direction. This thereby limits rotation of the spool 20 in the pull-out direction that is coupled to the lock gear 24 through the main torsion shaft 32, thus limiting pull-out of the webbing 22 from the spool 20. The body of the occupant attempting to move toward the vehicle front is thus restrained by the webbing 22.

In a state in which pull-out direction rotation of the lock gear 24 is prevented, should the body of the occupant pull on the webbing 22 with an even greater force, such that a rotational force in the pull-out direction acting on the spool 20 as a result of this pulling force exceeds a torsion-withstand load (deformation-withstand load) of the first energy absorption section 38 of the main torsion shaft 32, the force limiter mechanism 31 actuates, and torsion (deformation) of the first energy absorption section 38 permits rotation of the spool 20 in the pull-out direction at or above the force limiter load of the spool 20 (the torsion-withstand load of the first energy absorption section 38).

Accordingly, a load (burden) acting on the chest of the occupant from the webbing 22 is lessened due to the spool 20 rotating in the pull-out direction and the webbing 22 being pulled out from the spool 20 as a result the first energy absorption section 38 undergoing torsion. Moreover, kinetic energy of the occupant pulling the webbing 22 is absorbed in an amount commensurate with the torsion of the first energy absorption section 38.

On the other hand, as described above, rotation of the spool 20 in the pull-out direction with respect to the lock gear 24 means that the lock gear 24 rotates in the take-up direction relative to the spool 20. Accordingly, when the lock gear 24 rotates in the take-up direction relative to the spool 20, the base end portion 40A of the trigger wire 40 is moved in the circumferential direction of the main torsion shaft 32 while the leading end side of the base end portion 40A of the trigger wire 40 remains inserted through the hole 42 in the spool 20. Accordingly, the leading end side of the base end portion 40A of the trigger wire 40 is pulled toward the lock gear 24 side with respect to the hole 42.

The leading end portion 40B of the trigger wire 40 is thus pulled out of the hole 65 in the clutch guide 64 and the hole 91 in the clutch cover 88, and a state in which rotation of the clutch guide 64 relative to the spool 20 and the clutch cover 88 is prevented is released.

The clutch guide 64 is then rotated from the non-actuated position to the actuated position by biasing force of the coil springs 98. When this occurs, the spacing between the holes 89 in the clutch cover 88 (swing shafts 106 of the clutch plates 100) and the coupling walls 74 of the clutch guide 64 becomes shorter, and a leading end of the circular arc portion 104 of each clutch plate 100 is pressed (guided) in a tangential direction to the clutch guide 64 by the coupling wall 74. Each clutch plate 100 is thus swung toward the lock ring 190 side (see arrows R in FIG. 5A), and the knurled teeth 104A of the clutch plates 100 mesh together with the knurled teeth 190A of the lock ring 190 (the state illustrated in FIG. 5B). The clutch plates 100 and the lock ring 190 are thereby joined together. Moreover, when this occurs, each anchor portion 86 formed to the clutch base 82 presses a base end portion of the arm 102 of the corresponding clutch plate 100 in the pull-out direction, such that the clutch plates 100 are pressed against the lock ring 190, and thus maintaining the joined state between the two. Accordingly, the lock ring 190 attempts to rotate in the pull-out direction together with the pull-out direction rotation of the clutch mechanism 52 (the sleeve 54, the clutch base 82, and the clutch plates 100).

Furthermore, a controller, not illustrated in the drawings, determines whether or not the physical build of the occupant corresponds to a predetermined reference value or greater, based on a signal from a physical build detection device, and also determines whether or not the vehicle has been involved in a collision, based on a signal from a collision detection device. In cases in which the controller determines the physical build of the occupant to be the predetermined reference value or greater, the gas generator 194 illustrated in FIG. 6 and FIG. 7 is not actuated, and so the engaging portion 156 of the pawl 150 is disposed at the locked position, engaged with the notch 192 of the lock ring 190. Accordingly, rotation of the lock ring 190 in the pull-out direction is locked (prevented), thereby preventing pull-out direction rotation of the clutch mechanism 52 (the sleeve 54, the clutch base 82, and the clutch plates 100).

Then, as illustrated in FIG. 1, when, in the state in which pull-out direction rotation of the sleeve 54 is prevented, the body of the occupant pulls on the webbing 22 with an even greater force, such that a rotational force in the pull-out direction acting on the spool 20 as a result of this pulling force exceeds the sum of the torsion-withstand load (deformation-withstand load) of the first energy absorption section 38 of the main torsion shaft 32 and a torsion-withstand load (deformation-withstand load) of the second energy absorption section 50 of the sub torsion shaft 44, the first energy absorption section 38 and the second energy absorption section 50 twist (deform) so as to permit rotation of the spool 20 in the pull-out direction at the force limiter load (the sum of the torsion-withstand load of the first energy absorption section 38 and the torsion-withstand load of the second energy absorption section 50) or greater.

Accordingly, a load (burden) acting on the chest of the occupant from the webbing 22 is lessened due to the spool 20 rotating in the pull-out direction and the webbing 22 being pulled out from the spool 20 as a result of the first energy absorption section 38 and the second energy absorption section 50 undergoing torsion. Moreover, kinetic energy of the occupant pulling the webbing 22 is absorbed in an amount commensurate with the torsion of the first energy absorption section 38 and the second energy absorption section 50.

On the other hand, when, based on the signal from the physical build detection device, the controller determines the physical build of the occupant to be less than the predetermined reference value, and based on the signal from the collision detection device, the controller determines that the vehicle has been involved in a collision, the gas generator 194 illustrated in FIG. 6 and FIG. 7 is actuated under the control of the controller.

On actuation of the gas generator 194, gas ejected through the gas ejection section 194A of the gas generator 194 is supplied into the second cylindrical portion 204B of the cylinder 204, and the pressure inside the second cylindrical portion 204B and inside the first cylindrical portion 204A that is in communication with the second cylindrical portion 204B rises. The piston section 160 provided inside the first cylindrical portion 204A therefore moves inside the first cylindrical portion 204A. The press portion 160C of the piston section 160 that has been moved presses the arm 154 of the pawl 150. This results in the shear pin 132B inserted through the anchor hole 158 in the pawl 150 being sheared, such that the pawl 150 is rotated about the shaft support portion 132A. The engagement between the engaging portion 156 of the pawl 150 and the notch 192 of the lock ring 190 is thus released (the position of the pawl 150 when in this state is referred to as the "released position"). Rotation of the lock ring 190 in the pull-out direction is permitted as a result, thus enabling pull-out direction rotation of the lock ring 190 together with the clutch mechanism 52 (the sleeve 54, the clutch base 82, and the clutch plates 100) and the spool 20. Since torsion of the second energy absorption section 50 does not occur, rotation of the spool 20 in the pull-out direction is permitted at the force limiter load (torsion-withstand load of the first energy absorption section 38) or greater as a result of the first energy absorption section 38 undergoing torsion (deformation).

Namely, in cases in which the physical build of the occupant is the predetermined reference value or greater, the force limiter load is set to the sum of the torsion-withstand load of the first energy absorption section 38 and the torsion-withstand load of the second energy absorption section 50. Namely, a load value of the force limiter load is set to a high load. On the other hand, in cases in which the physical build of the occupant is below the predetermined reference value and a vehicle collision has been detected, the force limiter load is set to the torsion-withstand load of the first energy absorption section 38. Namely, the load value of the force limiter load is configured set to a low load. This thereby enables appropriate protection according to the physical build of the occupant.

Figure 9A:
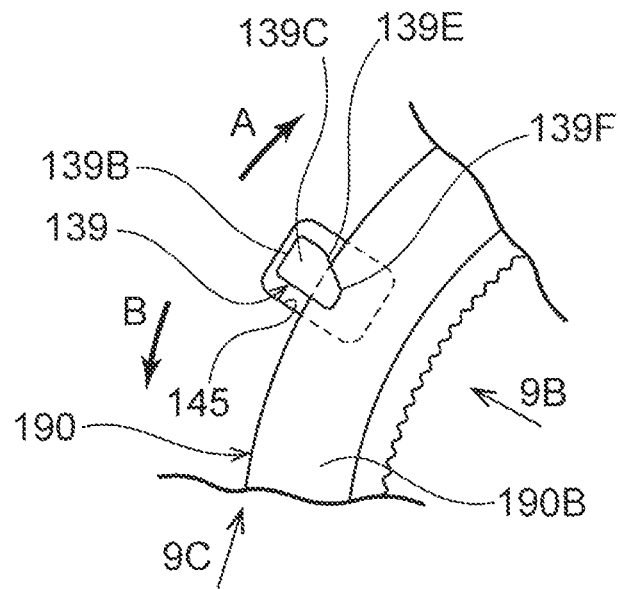
FIG. 9A is an enlarged view illustrating members including a lock ring engagement claw engaged with a lock ring prior to rotation of the lock ring.
Figure 9B:
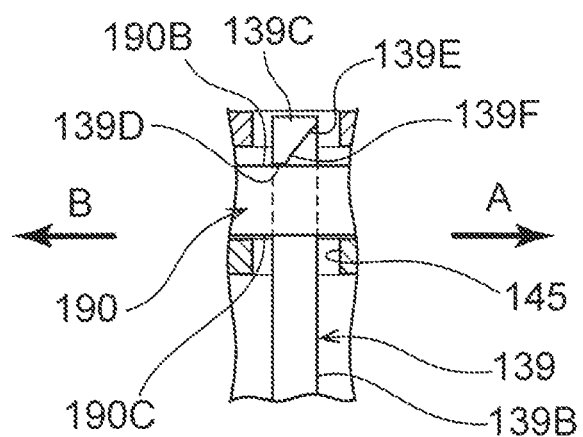
FIG. 9B is an enlarged view illustrating the lock ring engagement claw and the like as viewed along the direction indicated by arrow 9B in FIG. 9A.

Note that in the webbing take-up device 10 of the present exemplary embodiment, as illustrated in FIG. 9A to FIG. 9C, the leading end portion 139D of each lock ring engagement claw 139 of the body 122 abuts the face 190B on the one axial direction side of the lock ring 190, such that the lock ring 190 is interposed between the leading end portion 139D and the projection 143 provided to the body 122. This thereby enables axial direction movement of the lock ring 190 to be restricted. In this manner, in the present exemplary embodiment, there is no need to provide a member to restrict axial direction displacement of the lock ring 190 separately to the body 122, thereby enabling a reduction in the number of components configuring the webbing take-up device 10. Moreover, in the present exemplary embodiment, the leading end portion 139D of the lock ring engagement claw 139 utilizes the recovery force generated by flexural deformation of the first extension portion 139A, the second extension portion 139B, and the third extension portion 139C of the lock ring engagement claws 139 to apply a bias to the lock ring 190 side, thereby enabling the generation of noise resulting from displacement of the lock ring 190 inside the second housing portion 125 (recess 138) of the body 122 to be suppressed.

During rotation of the lock ring 190, the lock ring 190 slides against the leading end portions 139D of the lock ring engagement claws 139 provided to the body 122 and against the projection 143 provided to the body 122. Forming the portions that slide against the lock ring 190 (the leading end portions 139D and the projection 143) from a resin enables slide resistance during rotation of the lock ring 190 to be reduced.

Figure 10A:
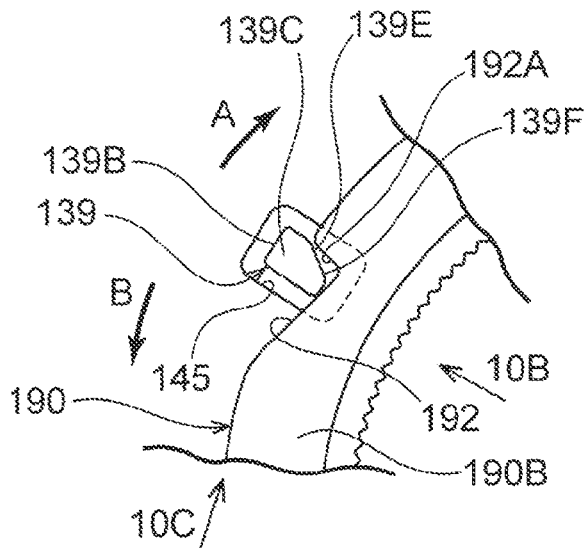
FIG. 10A is an enlarged view illustrating members including a lock ring engagement claw disposed in a notch of a lock ring due to rotating the lock ring.
Figure 10B:
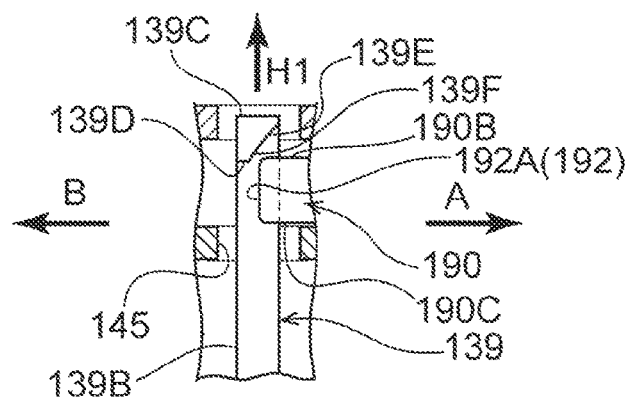
FIG. 10B is an enlarged view illustrating the lock ring engagement claw and the like as viewed along the direction indicated by arrow 10B in FIG. 10A.
Figure 10C:
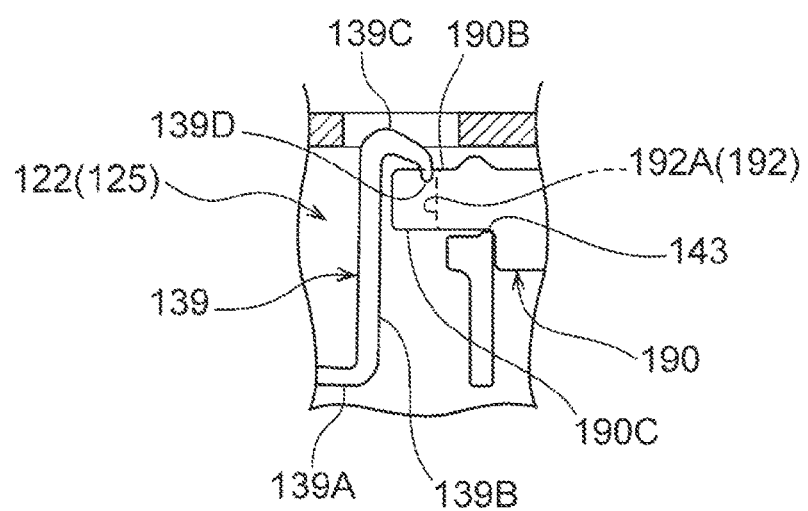
FIG. 10C is an enlarged view illustrating the lock ring engagement claw and the like as viewed along the direction indicated by arrow 10C in FIG. 10A.

Moreover, as illustrated in FIG. 10A to FIG. 10C, when the lock ring 190 rotates, the notch 192 formed in the lock ring 190 is disposed at a location corresponding to the lock ring engagement claws 139, such that the leading end portion 139D of the lock ring engagement claw 139 is disposed inside the notch 192 of the lock ring 190. Then, when the lock ring 190 is rotated further, an edge 192A of the notch 192 of the lock ring 190 presses the second pressed face 139F of the leading end portion 139D of the lock ring engagement claw 139 toward the one circumferential direction side (arrow B direction side). Note that the second pressed face 139F is inclined toward the one circumferential direction side (arrow B direction side) on progression toward the another axial direction side as viewed from the radial direction inside. Accordingly, when the edge 192A of the notch 192 of the lock ring 190 presses the second pressed face 139F of the leading end portion 139D of the lock ring engagement claw 139 toward the one circumferential direction side (arrow B direction side), the leading end portion 139D of the lock ring engagement claw 139 is moved toward the one axial direction side (is moved toward the arrow H1 direction side). The leading end portion 139D of the lock ring engagement claw 139 is thus expelled from the notch 192 of the lock ring 190, enabling obstruction of rotation of the lock ring 190 by the lock ring engagement claw 139 to be suppressed.

Figure 11A:
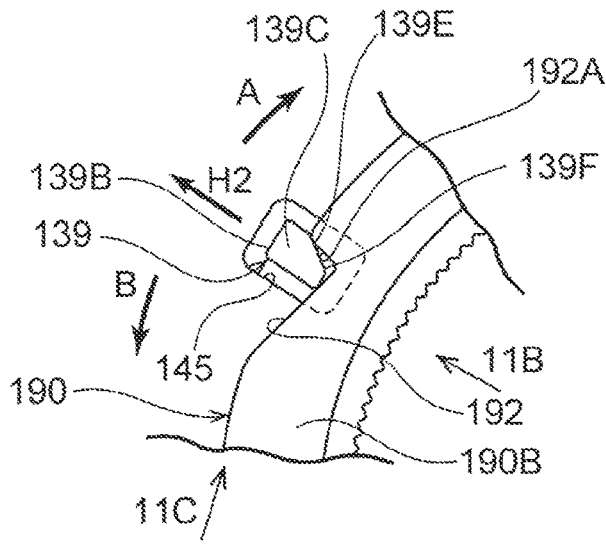
FIG. 11A is an enlarged view illustrating the members including the lock ring engagement claw when the lock ring has rotated further from the state illustrated in FIG. 10A.
Figure 11B:
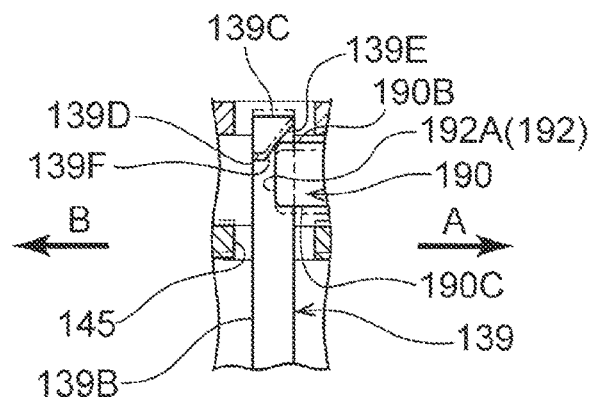
FIG. 11B is an enlarged view illustrating the lock ring engagement claw and the like as viewed along the direction indicated by arrow 11B in FIG. 11A.
Figure 11C:
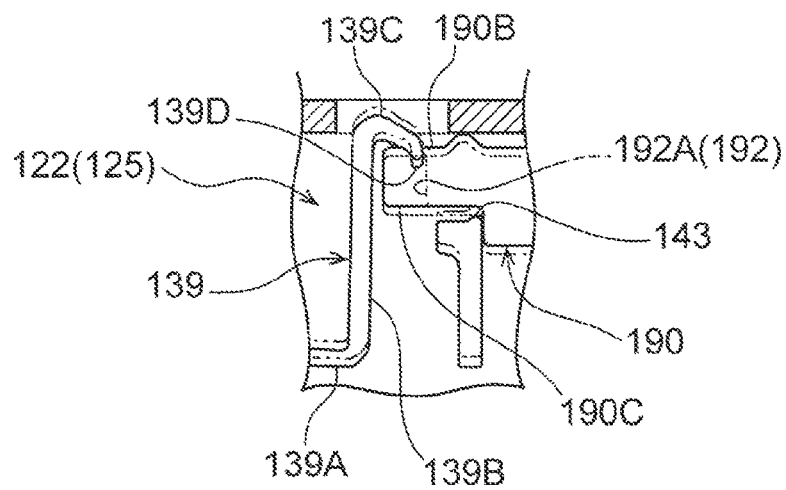
FIG. 11C is an enlarged view illustrating the lock ring engagement claw and the like as viewed along the direction indicated by arrow 11C in FIG. 11A

Moreover, as illustrated in FIG. 11A to FIG. 11C, the lock ring engagement claw 139 of which the leading end portion 139D is disposed in the notch 192 of the lock ring 190 does not bias the lock ring 190 toward the another axial direction side. It is therefore conceivable that the lock ring 190 may move toward the one axial direction side at a portion corresponding to the lock ring engagement claw 139. In such cases, a portion of the third extension portion 139C might be disposed in the notch 192 of the lock ring 190 in addition to the leading end portion 139D of the lock ring engagement claw 139. In this state, should the lock ring 190 rotate further, the edge 192A of the notch 192 of the lock ring 190 presses the first pressed face 139E of the third extension portion 139C of the lock ring engagement claw 139 toward the one circumferential direction side (arrow B direction side). Note that the first pressed face 139E is inclined toward the one circumferential direction side (arrow B direction) on progression toward the radial direction inside as viewed from the one axial direction side. Accordingly, when the edge 192A of the notch 192 of the lock ring 190 presses the first pressed face 139E of the third extension portion 139C of the lock ring engagement claw 139 toward the one circumferential direction side (arrow B direction side), the third extension portion 139C of the lock ring engagement claw 139 is moved toward the radial direction outside (is moved toward the arrow H2 direction side) together with the leading end portion 139D. The third extension portion 139C and the leading end portion 139D of the lock ring engagement claw 139 are thereby expelled from the notch 192 of the lock ring 190, enabling obstruction of rotation of the lock ring 190 by the lock ring engagement claw 139 to be suppressed.

Note that in the present exemplary embodiment, explanation has been given regarding an example in which the leading end portion 139D of the lock ring engagement claw 139 applies a bias to the lock ring 190 using the recovery force arising as a result of flexural deformation of the first extension portion 139A, the second extension portion 139B, and the third extension portion 139C of the lock ring engagement claw 139. However, the present invention is not limited thereto. Whether or not to the leading end portion 139D of the lock ring engagement claw 139 applies a bias to the lock ring 190 may be decided as appropriate, for example in consideration of demands pertaining to noise levels, or the frictional force arising between the leading end portion 139D of the lock ring engagement claw 139 and the lock ring 190.

Moreover, in the present exemplary embodiment, explanation has been given regarding an example in which the first pressed face 139E and the second pressed face 139F are provided in order to expel the third extension portion 139C and the leading end portion 139D of the lock ring engagement claw 139 from the notch 192 of the lock ring 190. However, the present invention is not limited thereto. Whether or not to provide the first pressed face 139E and the second pressed face 139F may be decided as appropriate in consideration of, for example, friction arising at the lock ring 190 due to the edge 192A of the notch 192 of the lock ring 190 catching on the lock ring engagement claw 139. Moreover, configuration may be made in which only one out of the first pressed face 139E or the second pressed face 139F is provided.

Explanation has been given regarding an exemplary embodiment of the present invention; however, the present invention is not limited to the above, and obviously various modifications may be implemented within a range not departing from the spirit of the present invention.

What is claimed is:

1. A webbing take-up device, comprising:
   a spool at which a webbing worn by an occupant is taken up, and that is rotated in a pull-out direction by the webbing being pulled out;
   a lock section that is restricted from rotating at a time of a vehicle emergency so as to limit rotation of the spool in the pull-out direction;
   a force limiter mechanism that permits rotation of the spool in the pull-out direction at a force limiter load or greater when rotation of the spool in the pull-out direction with respect to the lock section is being limited;
   a switching member that switches a load value of the force limiter load by switching between a rotation-restricted state and a rotation-enabled state; and
   a mounting member at which a restriction section is formed, the mounting member including a switching member mounting section at which the switching member is disposed, and the restriction section being engaged with the switching member so as to restrict displacement in a rotational axis direction of rotation of the switching member of the switching member disposed at the switching member mounting section.

2. The webbing take-up device of claim 1, wherein the restriction section applies a bias toward the switching member side using a recovery force arising as a result of elastic deformation of the restriction section in a direction away from the switching member.

3. The webbing take-up device of claim 1, wherein the restriction section is provided with a pressed portion that is configured to be pressed by a portion of the switching member in a rotational direction of the switching member when the switching member is rotated such that the pressed portion is moved in a direction away from the switching member.

4. The webbing take-up device of claim 3, wherein the pressed portion has at least one of a first face configured to be pressed by the portion of the switching member and a second face configured to be pressed by the portion of the switching member, the first face being inclined with respect to the rotational direction and a radial direction of rotation of the switching member, and the second face being inclined with respect to the rotational direction and the rotational axis direction.

5. The webbing take-up device of claim 1, wherein the restriction section is formed integrally with the mounting member.

* * * * *